United States Patent
Brockway, III et al.

(10) Patent No.: US 9,036,016 B2
(45) Date of Patent: May 19, 2015

(54) INITIAL CAMERA MODE MANAGEMENT SYSTEM

(75) Inventors: Richard T. Brockway, III, Los Altos, CA (US); Jeffrey S. Youel, Rancho Santa Fe, CA (US); John S. Chen, San Ramon, CA (US); Fabrice Barbier, San Carlos, CA (US)

(73) Assignee: GoPro, Inc., San Mateo, CA (US)

( * ) Notice: Subject to any disclaimer, the term of this patent is extended or adjusted under 35 U.S.C. 154(b) by 370 days.

(21) Appl. No.: 13/558,279

(22) Filed: Jul. 25, 2012

(65) Prior Publication Data

US 2014/0028435 A1    Jan. 30, 2014

(51) Int. Cl.
*H04N 7/18* (2006.01)
*H04N 5/232* (2006.01)

(52) U.S. Cl.
CPC ....... *H04N 5/23206* (2013.01); *H04N 5/23245* (2013.01)

(58) Field of Classification Search
CPC ....................................................... H04N 7/18
USPC ......... 348/61, 143, 169, 211.2; 396/124, 280, 396/56, 310; 386/264, 263; 705/27.1
See application file for complete search history.

(56) References Cited

U.S. PATENT DOCUMENTS

| | | | | |
|---|---|---|---|---|
| 5,649,240 | A * | 7/1997 | Saegusa | 396/124 |
| 5,721,989 | A * | 2/1998 | Kitazawa et al. | 396/280 |
| 6,341,201 | B1 * | 1/2002 | Ishiguro et al. | 396/56 |
| 6,415,107 | B1 * | 7/2002 | Ogawa | 396/310 |
| 7,599,608 | B2 * | 10/2009 | Takemoto et al. | 386/263 |
| 8,750,157 | B1 | 6/2014 | Jagannath et al. | |
| 8,811,206 | B2 | 8/2014 | Shukla | |
| 2004/0107366 | A1 | 6/2004 | Balfanz et al. | |
| 2005/0036766 | A1 * | 2/2005 | Takemoto et al. | 386/113 |
| 2007/0288331 | A1 * | 12/2007 | Ebrom et al. | 705/27 |
| 2008/0046545 | A1 | 2/2008 | Koren et al. | |
| 2008/0232780 | A1 | 9/2008 | Yamada | |
| 2008/0247377 | A1 | 10/2008 | Van Horn et al. | |
| 2008/0310405 | A1 | 12/2008 | Cox et al. | |
| 2010/0311441 | A1 | 12/2010 | Hazlett et al. | |
| 2011/0044303 | A1 | 2/2011 | Ji et al. | |
| 2011/0050926 | A1 * | 3/2011 | Asano | 348/211.2 |
| 2012/0044354 | A1 | 2/2012 | Cheng et al. | |
| 2012/0063337 | A1 | 3/2012 | Shukla | |
| 2012/0099572 | A1 | 4/2012 | Kato et al. | |

(Continued)

OTHER PUBLICATIONS

PCT International Search Report and Written Opinion for PCT/US2013/051548, Feb. 7, 2014, 14 Pages.

*Primary Examiner* — Paulos M Natnael
(74) *Attorney, Agent, or Firm* — Fenwick & West LLP

(57) ABSTRACT

A camera detects devices, such as other cameras, smart devices, and access points, with which the camera may communicate. The camera may alternate between operating as a wireless station and a wireless access point. The camera may connect to and receive credentials from a device for another device to which it is not connected. In one embodiment, the camera is configured to operate as a wireless access point, and is configured to receive credentials from a smart device operating as a wireless station. The camera may then transfer the credentials to additional cameras, each configured to operate as wireless stations. The camera and additional cameras may connect to a smart device directly or indirectly (for instance, through an access point), and the smart device may change the camera mode of the cameras. The initial modes of the cameras may be preserved and restored by the smart device upon disconnection.

12 Claims, 9 Drawing Sheets

(56) References Cited

U.S. PATENT DOCUMENTS

| | | |
|---|---|---|
| 2012/0110031 A1 | 5/2012 | Lahcanski et al. |
| 2012/0249802 A1* | 10/2012 | Taylor .......................... 348/169 |
| 2012/0322413 A1 | 12/2012 | Haddad et al. |
| 2012/0327225 A1* | 12/2012 | Barley et al. ................. 348/143 |
| 2013/0120592 A1 | 5/2013 | Bednarczyk et al. |
| 2013/0189925 A1* | 7/2013 | Staskawicz et al. ......... 455/41.1 |
| 2013/0222583 A1 | 8/2013 | Earnshaw |
| 2013/0223279 A1 | 8/2013 | Tinnakornsrisuphap et al. |
| 2013/0337857 A1 | 12/2013 | Hassan et al. |
| 2014/0028435 A1 | 1/2014 | Brockway et al. |
| 2014/0028817 A1 | 1/2014 | Brockway et al. |
| 2014/0028818 A1 | 1/2014 | Brockway et al. |
| 2014/0109184 A1 | 4/2014 | Parker |

\* cited by examiner

INITIAL CAMERA MODE MANAGEMENT SYSTEM

CROSS-REFERENCE TO RELATED APPLICATIONS

This application is related to the following applications: U.S. application Ser. No. 13/558,194, filed on Jul. 25, 2012, entitled "Credential Transfer Management Camera System," U.S. application Ser. No. 13/558,273, filed on Jul. 25, 2012, entitled "Credential Transfer Management Camera Network," and U.S. application Ser. No. 13/558,188, filed on Jul. 25, 2012, entitled "Device Detection Camera System."

BACKGROUND

1. Technical Field

This disclosure relates to a camera management system, and more specifically, to the detection of devices by a camera system, the passing of credentials between cameras and other devices, and the management of camera operation modes.

2. Description of the Related Arts

The technological advancement of cameras has progressed immensely in recent years. Cameras have recently begun to include features, such as wireless communication capabilities, previously unavailable to cameras. The incorporation of wireless communication capabilities into cameras provides a means for cameras to communicate with other devices.

Cameras may operate in a plurality of modes when communicating with other devices. One such mode allows a camera to operate as a wireless access point for one or more other devices (hereinafter, "access point mode"). Another such mode allows a camera to operate as a wireless station (hereinafter, "station mode"). Typically, connections between two wireless devices require at least one of the devices to be in access point mode; in such instances, two devices in station mode cannot connect to each other. The remainder of the description herein will operate under the assumption that at least one device must be in access point mode in order to establish a connection between two devices. Finally, cameras may operate as intermediaries between devices in station mode and devices in access point mode by receiving and/or forwarding communications between such devices (hereinafter, "ad hoc mode"). Collectively, access point mode, station mode, and ad hoc mode are referred to herein as "communication modes." It should be noted that generally a device operating in station mode may only connect to a single device, whereas a device operating in access point mode or ad hoc mode may connect to any number of other devices, including multiple devices operating in station mode.

The various communication modes available to cameras and the limitations of such modes impose a variety of challenges that must be addressed when designing camera-based systems. In addition, the operation of cameras within such a system requires a management system to satisfy the requirements of communications standards, particularly during the detection of devices in such a camera system and in the transfer of credentials between the devices.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

Figure 1:
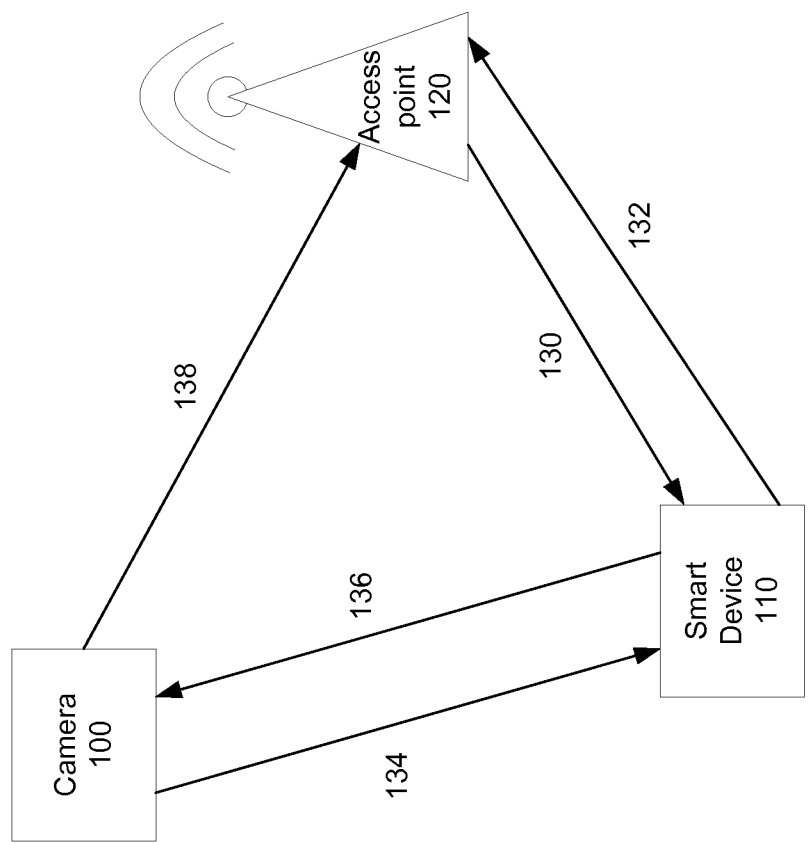
FIG. 1 is a block diagram illustrating an embodiment of a camera system.

The Figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

An image capture system provides photographers, professional and amateur, a configuration for capturing images and video at high resolutions and frame rates. The cameras described herein may be consumer grade while the configuration of the cameras allows for the wireless transfer of data between the cameras and other devices without the expense of professional grade equipment.

The camera system described herein allows consumers to capture high-resolution and high-frame rate images and video of local events or activities, including sporting events, theater performances, concerts, weddings, or other events without requiring a professional photographer and advanced camera equipment. It should be noted that for the purposes described herein, video capture is performed by the capture of successive images ("frames"), and thus functionality described herein making reference to one of either video capture or image capture is applicable to both.

The cameras described herein may include various camera settings (referred to herein as "camera modes" or "operation modes"). Example camera modes include various video recording modes (such as a normal video recording mode and a high-speed video recording mode, etc.), various video playback modes (such as a normal video playback mode, a high-speed playback mode, a slow-motion playback mode, a paused video mode and the like), various image capture modes (normal image capture, timed image capture, rapidsuccessive multiple-image capture, etc.), and various image playback modes (normal captured image display, multiple-image display, slideshow image display, etc.).

In addition, the cameras may include various camera modes related to camera properties. In one embodiment, the camera modes include various image resolutions for capture and playback, such as 300×480, 480×360, 640×480, 768×576, 720×480, 1280×720, 1280×960, 1440×1080, 1920×1080, 2048×1080, 4096×2160, 7680×4320, any other industry standard resolution, or any other resolution. Likewise, the camera modes may include various video resolutions for capture and playback, such as 480i/p, 576i/p, 720p, 1080i/p, any other industry standard resolution, or any other resolution. The cameras may include camera modes for various capture and playback aspect ratios (such as 4:3, 16:9, and the like) and various frame capture and playback frame rates (such as 15 fps, 24 fps, 30 fps, 45 fps, 60 fps, 90 fps, 120 fps, and the like). The cameras may also include camera modes for various color, brightness, contrast, and audio settings, and may include many auto-detect modes for detecting the ideal settings for image and video capture given the camera's context (such as a night mode, a long distance mode, a people mode, a scenery mode, an underwater mode, and the like).

The camera may include various camera modes related to data transfer. In one embodiment, the cameras include camera modes for starting and stopping the streaming of previously captured image or video data, or for image and video data in the process of being captured. For example, a camera mode may allow a camera to stream video being captured to another device, while another camera mode may allow the camera to stream previously captured images to a cloud storage system, a photo or video website, or a social network.

The camera may include various camera modes related to image and video editing. In one embodiment, the cameras include camera modes for editing previously captured images, allowing a user to, for example, increase the brightness of an image, crop an image, resize an image, remove features from an image, reduce image "redeye", and the like. Similarly, the cameras may include camera modes for editing previously captured video, allowing a user to, for example, change the contrast of the video, change the video frame rate, crop the video, increase or decreased the volume of the capture audio, include external audio (such as a music track) in the video, and the like.

A camera may include various camera modes related to the mechanical operation of the camera. In one embodiment, the cameras include zoom in and zoom out modes for adjusting the zoom of the camera lenses. Similarly, the cameras may include exposure time modes for adjusting the length of the exposure of a scene before a camera onto the camera's image sensor. A camera may include camera modes related to the focal length of the camera or the F-number of the camera. A camera may include various flash modes, for instance a no-flash mode, an always-flash mode, or a flash autodetect mode. A camera may include any other camera mode related to the camera, the setting or context of the camera, the user of the camera, image or video capture, image or video playback, data streaming, camera mechanical functionality, or any other aspect of camera use. A camera may also include the means to allow the remote adjustment of the physical position, rotation, or orientation of the camera (for instance via a mechanical engine for re-positioning the camera).

The camera in the camera system described herein beneficially switches between communication modes in order to detect devices operating in various wireless modes. Certain devices are only able to operate in certain modes. For example, many mobile phones are only capable of operating in station mode. Accordingly, in order to connect to such mobile phones, the camera must switch to access point mode or ad hoc mode. Likewise, certain devices, such as wireless receiver and transmitter devices (for instance, routers, mobile phone towers, switches, and the like), may operate as dedicated access points. Accordingly, in order to connect to such access points, the camera may operate in station mode. It should be noted that in one embodiment, in order for a device configured to operate in access point mode to detect and connect to a device configured to operate in station mode, the access point mode device sends out a beacon signal identifying and indicating the availability of the access point mode device, and the station mode device, upon receiving this beacon signal, requests a connection to the access point mode device. Although in such an embodiment it is the station mode device that initiates the connection request between the devices, the description herein may describe either the access point mode device or the station mode device as the connecting or connection-instigating device.

In one embodiment, it is desirable for a camera in such camera systems to operate in station mode, as station mode may require less power than access point mode or ad hoc mode, and as a result, the camera is such camera systems operate in station mode by default. Users of the camera system may not understand the difference between wireless communication modes, and may not appreciate the limitations of each; accordingly, it may be desirable for a camera in a camera system to automatically switch between communication modes in order to automatically wireless devices regardless of the communication mode of the wireless devices.

Communication between wireless devices often requires one of the devices to possess information about the other device. For example, communication between wireless devices may require a first device to know the name of a second device, to know the IP or MAC address of the second device, an access password of the second device, an encryption method of the second device, a communication format or protocol of the second device, any communication timing requirements of the second device, a user account associated with the second device, a network name or identity associated with the second device, or any other property of the second device. This information is referred to collectively herein as the "credentials" or "credential information" of a wireless device. A dedicated access point, such as a router, a modem, a cell phone tower, and the like, require other devices to send the credentials of the access point to the access point prior to communicating with the access point. A device may contain the credentials of another device (for instance, the credentials may be programmed into the device by a manufacturer, may have been previously entered and stored for subsequent use, and the like), or the credentials of the other device may be obtained (for instance, by a user's manual entry). Generally, a wireless device must obtain the credentials of another device prior to communicating with the other device, though in some embodiments, devices may connect and communicate without obtaining each other's credentials.

Often, cameras lack sophisticated input devices and interfaces. For example, while typical computers have keyboards and mice, and while phones have keypads, camera inputs are often limited to a few buttons. Sport cameras may have as few as one or two buttons. The lack of a sophisticated input interface may limit the ability of a user to enter information into a camera. Accordingly, entering device credentials into a camera with such a limited input interface manually may be frustrating and time-consuming at best, and prohibitively difficult at worse.

Detecting Wireless Devices

FIG. 1 is a block diagram illustrating an embodiment of a camera system. In the embodiment of FIG. 1, a camera 100 communicates with other wireless devices, such as a smart device 110 and an access point 120. In order to wirelessly communicate with other devices, the camera 100 must first detect the other devices to which the camera 100 can wirelessly communicate. The camera 100 may ping wireless devices over a range of wireless frequencies and wireless modes in order to detect devices capable of wirelessly communicating with the camera 100. Alternatively, the camera 100 may know in advance the frequencies and wireless modes of other devices, and may examine these frequencies and modes to detect wireless devices. As discussed below, the camera 100, in response to detecting one or more wireless devices, may attempt to connect with the one or more wireless devices.

In order to detect other wireless devices, the camera 100 may send out a query ping signal over a communicative range of the camera 100. The communicative range of the camera 100 is the range over which the camera 100 can transmit signals and maintain signal integrity. The query signal transmitted by the camera 100 may be configured to cause any wireless devices in the communicative range of the camera 100 to respond with an identifying signal. The identifying signal may include various information, such as information about the identity of the wireless device, information about the communicative mode or the operating mode of the wireless device, information about the availability of the wireless device, and so forth. As used herein, "availability" refers to the ability of the wireless device to be detected, connect to, and communicated with. By receiving the identifying signal, the camera 100 is able to identify the wireless device, and may be able to determine the communicative mode and availability of the wireless device. Thus, the camera 100 may detect any of number of wireless devices by sending out a query signal and receiving an identifying signal from any or all of the wireless devices within the communicative range of the camera 100. The query signal may be configured to cause only wireless devices configured in a particular operation mode to send an identifying signal (such as devices configured to operate as wireless access points or devices configured to operate as wireless stations).

In one embodiment, the camera 100 detects and communicates with other devices using the IEEE 802.11 WiFi protocol. In this embodiment, the camera 100 detects other devices in the WiFi pre-association/association mode (hereinafter, simply "association mode"). During association mode, the camera 100 configures itself to detect and associate with one or more other WiFi devices. As discussed above, some devices are configured to only operate in station mode; such devices can only communicate with devices in access point mode or ad hoc mode. In one embodiment, the smart device 110 is such a device, and thus in order to communicate with the camera 100, the camera 100 must be configured to operate in access point mode or ad hoc mode. Accordingly, the association mode of the camera 100 may be configured such that the camera 100 switches between access point mode and station mode, or between access point mode, ad hoc mode, and station mode.

In some embodiments, it is preferable for wireless devices to operate in station mode, which requires less power and processing power than access point mode or ad hoc mode. Accordingly, the camera 100 may initialize to station mode, may cycle from station mode through access point mode and/or ad hoc mode (to detect devices configured to operate in station mode), and may return to station mode. Such a configuration maximizes the amount of time the camera 100 is configured to operate in station mode, and thus optimizes the power performance and efficiency of the camera 100. While the camera 100 is in access point mode or ad hoc mode, it may be configured to constantly scan for new devices. Likewise, when the camera 100 initializes to station mode, or when it returns to station mode after cycling through modes, the camera 100 may constantly or periodically scan for new devices.

The camera 100 may cycle between access point mode, ad hoc mode, and station mode in response to an input from a user. For example, the camera 100 may have a "detect devices" input, or an "association mode" input, which causes the camera 100 to cycle through configuration modes. Alternatively, the camera 100 may automatically cycle between modes, for example, when the camera 100 is in station mode and has not detected any devices after a pre-determined amount of time has passed. In such an embodiment, the camera 100 may periodically cycle between modes each time a predefined time period elapses, e.g., 10 minutes, without detecting additional devices. In one embodiment, each time the camera 100 cycles between modes and does not detect other devices, the period of time between each subsequent cycling between modes increases. For example, after the first time the camera 100 cycles between access point mode, ad hoc mode, and station mode, the camera 100 may wait 5 minutes before again cycling between modes; after the second cycle without detecting devices, the camera 100 may wait 10 minutes, after the third cycle, the camera 100 may wait 15 minutes, and so on.

When cycling between station mode, access point mode, and ad hoc mode, the camera 100 may detect and attempt to connect with other devices. The camera 100 may detect devices configured to only operate in station mode when the camera 100 is in access point mode or ad hoc mode. Thus, in the embodiment where the smart device 110 is configured to only operate in station mode, the camera 100 can still detect the smart device 110 when the camera 100 cycles to access point mode or ad hoc mode, despite the camera 100 being configured to operate in station mode a majority of the time.

When cycling between communication modes, the camera 100 may spend a pre-determined amount of time configured to operate in access point mode and ad hoc mode before returning to station mode. For example, if the camera 100 switches to access point mode, if the camera 100 has not detected other devices within 10 seconds, the camera 100 may switch to ad hoc mode for 10 seconds, and may return to station mode if devices are not detected while in ad hoc mode. In one embodiment, if the camera 100 detects other devices in either access point mode or ad hoc mode, the camera 100 may remain configured in access point mode or ad hoc mode until communication with the detected other devices is completed. When communication with a device configured to operate in station mode is completed, the camera 100 may (prior to returning to station mode) remain configured in access point mode or ad hoc mode for a pre-determined amount of time, in order to detect and communicate with other devices configured to operate in station mode.

After cycling through access point mode and ad hoc mode, the camera 100 reverts to station mode and may detect devices configured to operate in access point mode or ad hoc mode. For example, if the camera 100 fails to detect devices while in access point mode and/or ad hoc mode, or after the camera 100 is finished communicating with devices while in access point mode and/or ad hoc mode, the camera 100 switches to station mode, at which point it can connect to the access point 120. While the camera 100 may be able to connect to the access point 120 while in access point mode or ad hoc mode itself, such a configuration is less power-efficient than if the camera 100 connects to the access point 120 while the camera 100 is in station mode. If the camera 100 detects that the access point 120 or any other device is configured to operate in access point mode, the camera 100 may delay connecting to the access point 120 or other device until the camera 100 is in station mode. In one embodiment, the camera 100 may attempt to detect other devices in a particular communication mode (such as access point mode), and upon detecting devices, may determine if any detected devices are trusted devices, such as previously known devices, a particular type or model of device, devices manufactured by a particular company, devices associated with a particular IP address or MAC address, devices including particular credentials or other characteristics, and the like. In this embodiment, if no devices are detected, or if no detected devices are trusted devices, the camera 100 can cycle to a different communication mode (such as station mode) and attempt to detect devices in the new communication mode.

Once the camera 100 detects other devices to which it can communicate, the camera 100 may attempt to establish a connection with the detected devices. In one embodiment, the camera 100 may establish a connection with another device only if both the camera and the other device are in an association mode. In such an embodiment, both the camera and the other device are configured to establish a connection with devices also in an association mode. In order to ensure both the camera 100 and the other device are in an association mode, a user may input a command to enter an association mode on both devices. Configuring the camera 100 to cycle through access point mode, ad hoc mode, and station mode may cause the camera 100 to enter association mode. Likewise, pressing a button or interfacing with another form of input on the other device may cause the other device to enter association mode. Alternatively, the camera 100 and a device may each have a synchronization (or "synch") mode which may be triggered by a user, or which may trigger automatically, causing the camera 100 and device to connect when synchronized.

Establishing a connection between the camera 100 and a detected device involves the passing of the credentials of the detected device from the camera 100 to the detected device, or vice versa. In one embodiment, in order to establish a connection between the camera 100 and the detected device, the camera 100 must have the credentials of the detected device, and the detected device must have the credentials of the camera. Alternatively, in another embodiment, a detected device may be configured such that the camera 100 may connect to the detected device without the passing of credentials. In the event that the camera 100 does not possess the credentials of a detected device and still attempts to connect to the detected device requiring such credentials, the connection may be denied, or the detected device may prompt the camera to obtain the credentials of the detected device. It should be noted that "providing credentials" may not involve the explicit transmission of the credentials of a detected device to the detected device, but may instead involve the mere use of information contained within the credentials to identify the camera 100 to the detected device or to follow a particular protocol required by the detected device in order to connect to the detected device.

In one embodiment, the camera 100 can detect other cameras. For example, if the camera 100 is configured to operate in access point mode, and one or more other cameras are configured to operate in station mode, the camera 100 may detect and attempt to connect to the one or more other cameras. The devices to which the camera 100 may detect and connect may be limited. Likewise, the devices able to detect and connect to the camera 100 may be limited. For instance, a manufacturer may program the camera 100 to detect and connect to only devices made by the manufacturer. Alternatively, an owner of the camera 100 may limit the devices to which the camera 100 can detect and connect to only commonly-owned devices. The devices to which the camera 100 may detect and connect to may be limited based on Internet Protocol ("IP") or Media Access Control ("MAC") address (for instance, the camera 100 may include a list of IP or MAC addresses associated with devices to which the camera 100 may connect, or to which the camera 100 may not connect). In one embodiment, the camera 100 is configured to use the multicast domain name system (mDNS) protocol to detect devices to which to connect. Likewise, the devices to which the camera 100 may detect and connect to may be limited based on password (for instance, the camera 100 may include a password that another device must possess in order to connect to the camera 100). In one embodiment, a camera 100 is configured to hide the service set identifier (SSID) associated with the camera 100, preventing other devices from detecting the camera 100. In this embodiment, the camera 100 may be configured to allow a user to unhide the SSID of the camera 100 (for instance, by pressing a button or entering an input associated with unhiding the SSID of the camera 100), allowing other devices to detect the camera 100 for a period of time.

Obtaining Wireless Credentials

The camera 100 may obtain the wireless credentials of another device in a number of ways. In one embodiment, the camera 100 may obtain the wireless credentials of a first wireless device wirelessly from a second wireless device. In the example embodiment of FIG. 1, the camera 100 receives credentials for an access point 120 from a smart device 110. The access point 120 may be any device able to communicate wirelessly in access point mode, such as a wireless router, a Wifi/WiMax access point, a cell phone tower, a computer, a mobile phone, and the like. The smart device 110 may be any device capable of communicating with the camera 100, such as a mobile phone, a computer, a tablet, a remote control, and the like. In one exemplary embodiment, the smart device 110 is a smart phone and the access point 120 is a cell phone or mobile phone tower.

It is presumed in the embodiment of FIG. 1 that the camera 100 is able to initially communicate with the smart device 110. In the event that the camera 100 and the smart device 110 communicate wirelessly, this may require the camera 100 to initially possess the credentials of the smart device 110, or vice versa. In such an embodiment, the manufacturers of the camera 100 may include the credentials for the smart device 110 in the camera 100 (e.g. by pre-configuring the camera with the credentials), or the user of the camera 100 may manually upload the credentials of the smart device 110 to the camera 100 (e.g., using a program and input means associated with the smart device 110 to enter the credentials and transfer the credentials to the camera 100). Alternatively, the camera 100 and the smart device 110 may be configured to synchronize to each other via user input, via mutual credential passing, via a pre-determined synchronization protocol, via a wired connection, and the like. It is also presumed that the camera 100 does not initially possess the wireless credentials of the access point 120, and thus is not initially able to communicate with the access point 120 apart from detecting the presence of the access point 120.

The camera 100 is configured to request the credentials of the access point 120 from the smart device 110. In one embodiment, the camera 100 requests credentials for the access point 120 in response to detecting, attempting to connect to, and being denied by the access point 120. The request 134 sent by the camera 100 identifies the access point 120 to the smart device 110. The request 134 may contain additional information, such as the identity of the camera 100, the identity of a user of the camera 100, login or user account information for the smart device 110, or any other information that may be used by the smart device 110 to obtain user credentials for the access point 120.

The smart device 110 is configured to receive requests for credential information from the camera 100 and to provide credential information to the camera 100. The smart device 110 may be configured to verify the identity of the camera 100 or the user of the camera 100 based on the information contained within the request 134, prior to providing or requesting the credentials of the access point 120. The smart device 110 identifies the requested credentials, for instance based on the identified access point 120 in the request 134. In one embodiment, the smart device 110 already possesses the credentials for the access point 120 prior to receiving the request 134. For instance, the smart device 110 may have previously received and stored the credentials of the access point 120. In such an embodiment, the smart device 110 sends the credentials 136 to the camera 100.

In the event the smart device 110 does not possess the credentials of the access point 120, the smart device requests the credentials from the access point 120. The request 132 identifies the smart device 110 to the access point 120. In one embodiment, the request 132 includes the identity of the smart device 110, the identity of the camera 100, the identity of the user of the camera 100, login or user account information used to access the access point 120, or any other information used by the access point 120 to provide credentials for the access point 120 to the smart device 110. The access point 120 and the smart device 110 may communicate wirelessly or via other means. The credentials are provided by the access point 120 to the smart device 110 as the credentials 130, and are then provided by the smart device 110 to the camera 100 as the credentials 136.

In one example embodiment, the camera 100 and the smart device 110 communicate wirelessly, and the smart device 110 is configured to only operate in station mode. In such an embodiment, the camera 100 may initially detect the access point 120 while the camera 100 is operating in station mode. The access point 120 may deny a connection request from the camera 100, and the camera 100 may switch to access point mode. The camera 100 may detect and connect to the smart device 110 operating in station mode, and may request the credentials of the access point 120. In response to receiving the credentials for the access point 120 from the smart device 110, the camera 100 may switch back to station mode, and may re-attempt to connect to the access point 120 using the credentials received from the smart device 110. In an example of this embodiment, the smart device 110 is a smart phone, and a user may request and receive the credentials for a wireless router from the smart phone by switching a camera to access point mode or ad hoc mode, connecting to the smart phone, receiving the credentials from the smart phone, switching back to station mode, and connecting to the wireless router using the credentials.

Alternatively, the camera 100 may connect to and receive credentials from the smart device 110 via a wired connection. In one embodiment, the camera 100 may connect to the smart device 110 via USB or Ethernet cable, or via other wired means. The camera 100 and the smart device 110 may contain interfaces that allow credentials to be stored on and retrieved from a removable non-transitory computer-readable storage media, e.g., a memory card or disk drive. The camera 100 and the smart device 110 may communicate and pass credentials for the access point 120 via a wireless interface, e.g., an infrared or Bluetooth wireless connection.

In one embodiment, the smart device 110 includes an audio jack and is configured to encode the credentials of the access point 120 into an audio signal. In this embodiment, the camera 100 is configured to couple to the smart device 110 via the audio jack, and to receive the audio signal including the encoded credentials. The camera 100 is further configured to decode the received audio signal to obtain the credentials for the access point 120. The smart device 110 may encode the credentials into an audio signal using any suitable encoding means or method, for example by transforming data representing the credentials into a series of audio frequencies using a mapping that maps sequences of bits to frequencies. The camera 100 may decode an audio signal encoded in such a way using the same mapping.

In one example embodiment, the smart device 110 is configured to encode the credentials of the access point 120 into an audio signal, and is further configured to play this audio signal on a speaker of the smart device 110. In this embodiment, the camera 100 is configured to receive and capture the played audio signal at a microphone on the camera 100. The camera 100 is then configured to decode the captured audio signal to obtain the credentials of the access point 120.

In one example embodiment, the smart device 110 is configured to encode the credentials of the access point 120 into an image, and to display the image to the camera 100. In this embodiment, the camera 100 is configured to take a picture of the displayed image, and to decode the captured image to obtain the credentials of the access point 120. The smart device 110 may use any suitable means or method to encode credentials into an image, such as a barcode, a QR code, and the like.

Figure 2:
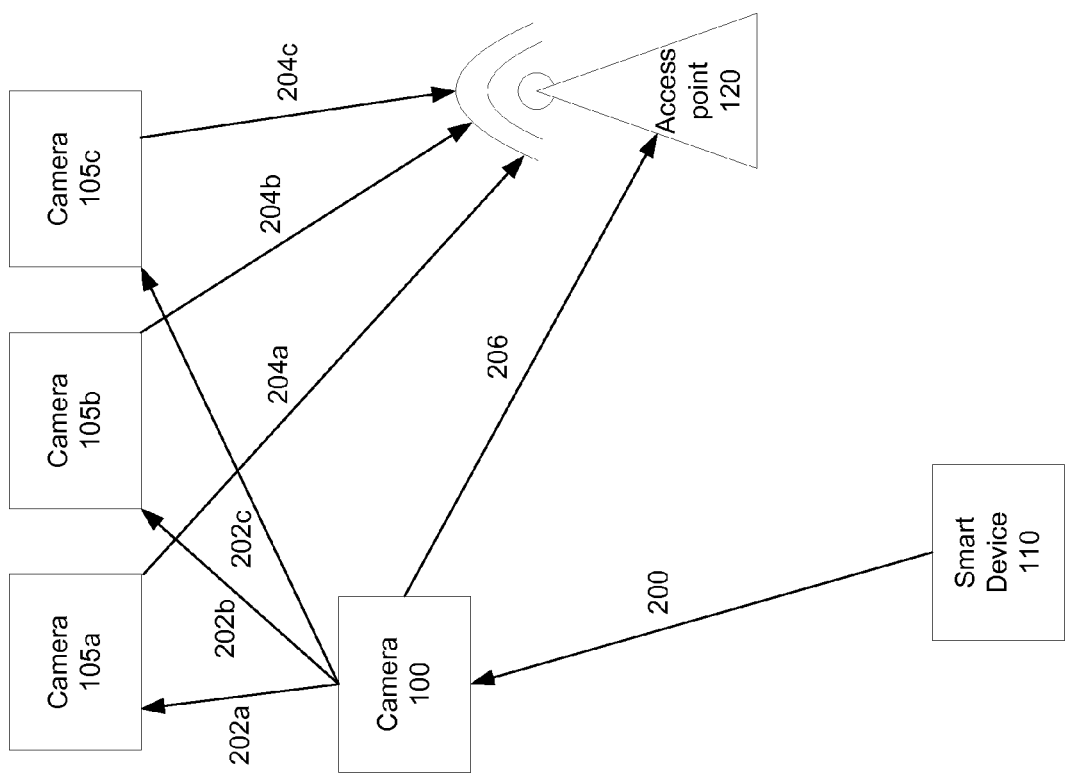
FIG. 2 is a block diagram illustrating an example embodiment of a camera system.

Once the camera 100 receives the wireless credentials for the access point 120 from the smart device 110, the smart device 110 may provide the credentials to other cameras, or the camera 100 may be configured to provide these credentials to other cameras. FIG. 2 is a block diagram illustrating an embodiment of a camera system. In the embodiment of FIG. 2, the camera 100 receives the credentials 200 for the access point 120 from the smart device 110, and provides the credentials 202a, 202b, and 202c (collectively, the "credentials 202") to the cameras 105a, 105b, and 105c (collectively, the "cameras 105"), respectively. In the embodiment of FIG. 2, only three cameras 105 are displayed; other embodiments may have any number of cameras, for example 50 or 100.

In one example embodiment, the smart device 110 is unable to operate in any wireless mode other than station mode, requiring the camera 100 to be configured to operate in access point mode or ad hoc mode in order to be able to receive the credentials 200 wirelessly. In this embodiment, the camera 100 may remain in access point mode or ad hoc mode to detect and connect to the cameras 105 operating in station mode. In such an embodiment, the camera 100 may connect to the cameras 105 and pass the credentials 202 simultaneously. After the camera 100 passes the credentials 202 to the cameras 105, the camera 100 may then switch to station mode for connecting to the access point 120.

The camera 100 may instead switch to station mode prior to connecting to the cameras 105, though such a configuration would require each of the cameras 105 to be operating in access point mode or ad hoc mode prior to connecting. This configuration may not be preferable, as it may result in more cameras operating in less-efficient modes. In addition, as devices operating in station mode can generally only connect to one other device at a time, this configuration would require the camera 100 to connect to each of the cameras 105 individually, resulting in a less time-efficient credential-passing process, particularly in embodiments with large numbers of cameras 105.

Once the camera 100 and each of the cameras 105 possess the credentials for the access point 120, the cameras 100, 105 may connect to the access point 120. As discussed above, connecting to the access point 120 may require the cameras 105 passing the credentials as credentials 204a, 204b, and 204c (collectively, the "credentials 204") to the access point 120, and the camera 100 to pass the credentials as credentials 206 to the access point 120. Prior to connecting to the access point 120, the camera 100 and the cameras 105 may switch to station mode in order to improve the power efficiency of the cameras. It should be noted that when each of the cameras 100, 105 receive the credentials for the access point 120, the cameras 100, 105 may store the credentials for later use in connecting to and communicating with the access point 120, preventing the need for re-obtaining the credentials from the smart device 110 at a later point in time. Beneficially, by receiving the credentials from the smart device 110, the camera 100 is able to receive the credentials of the access point 120 without the need for a display, and with the use of a minimal user input.

Control of Camera by Smart Device

The camera 100 and the smart device 110 may be configured to connect to each other, and may be further configured such that the smart device 110 may provide an interface for controlling various functionalities of the camera 100 and for receiving various data from the camera 100 (hereinafter "controlling" a camera). In one embodiment, the smart device 110 may provide an interface for controlling the camera 100 while the smart device 110 and the camera 100 are connecting during the requesting, retrieval, and passing of credentials from the smart device 110 to the camera 100. Alternatively, the smart device 110 may provide an interface for controlling the camera 100 at any other time the smart device 110 is connected to the camera 100, for instance in response to an input from a user of the camera 100 or the smart device 110 to connect the camera 100 and the smart device 110.

In the embodiments of FIG. 1 and FIG. 2, the smart device 110 is configured to operate in station mode, resulting in a configuration where the smart device 110 is only able to connect to (and control) one camera (for instance, camera 100) at a time when directly connected to the camera. Alternatively, the smart device 110 may be configured to connect to multiple cameras indirectly, for example, by connecting to the cameras through the access point 120 as illustrated in FIG. 3.

Figure 3:
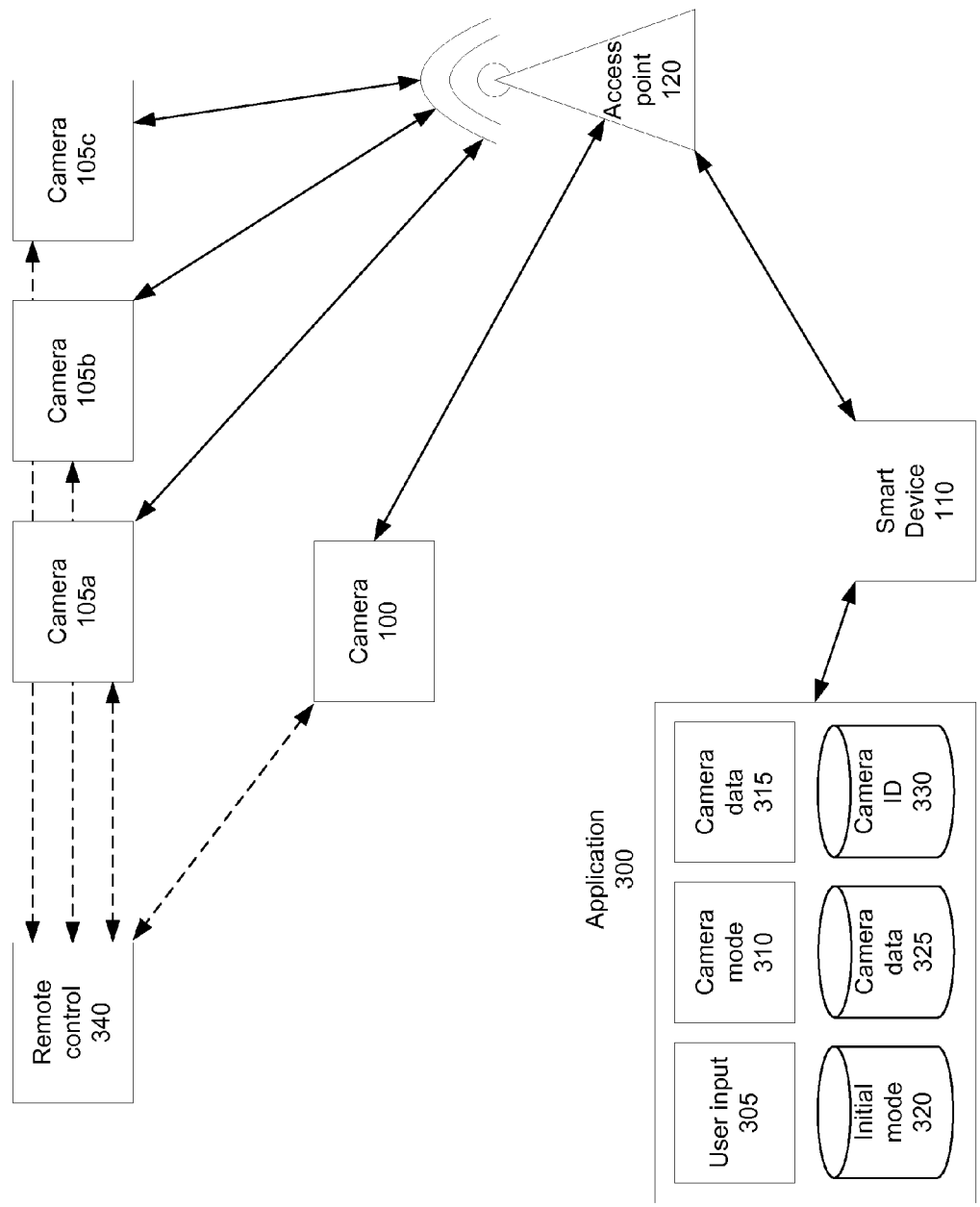
FIG. 3 is a block diagram illustrating an example embodiment of a camera system.

FIG. 3 is a block diagram illustrating an embodiment of the camera system. The embodiment of FIG. 3 includes a camera 100, cameras 105a, 105b, and 105c, a remote control 340, a smart device 110 running an application 300, and an access point 120. In the embodiment of FIG. 3, the smart device 110, operating in station mode, connects to the access point 120, operating in access point mode, which in turn connects to each of the camera 100 and the cameras 105. In this embodiment, smart device 110 is said to logically connect to the cameras 100, 105 via the access point 120. The smart device 110 may control each of the cameras by sending commands to the cameras and receiving data from the cameras through the access point 120, which routes communications and data from the smart device 110 to the cameras and vice versa. As discussed above, since the access point 120 is configured to operate in access point mode, multiple cameras may connect to the access point 120 simultaneously, overcoming the limitation of the smart device 110 being able to connect to only one other device when operating in station mode.

In the embodiment of FIG. 3, the smart device 110 may be configured to control all of the cameras simultaneously, or may be configured to control just a subset of the cameras at a time. For instance, the smart device 110 may instruct all connected cameras to begin recording simultaneously, and may subsequently instruct one or two cameras to stop recording while the remaining cameras continue recording. The functionality of the control interface of the smart device 110 will be discussed below in greater detail.

The smart device 110 may connect to one or more cameras, e.g. cameras 100, 105, via additional means or mechanisms for the purposes of controlling the one or more cameras. For example, the smart device 110 may control a camera when connected to the camera via USB or Ethernet cable. Likewise, the smart device 110 may control a camera when the camera is connected to an audio jack on the smart device 110. Finally, the smart device 110 may control a camera, e.g. cameras 100, 105, when the camera is connected to the smart device 110 via IR or Bluetooth. In these embodiments, the smart device 110 may send data to and receive data from one or more cameras via the means of connection between the cameras and the smart device 110. Note that these connection technologies may limit the distance between the smart device 110 and one or more cameras, potentially reducing the effectiveness of such a system.

The smart device 110 may be used to control one or more cameras, e.g. cameras 100, 105, to which the smart device is connected in a number of ways. In one embodiment, the smart device 110 may be configured to change the camera modes and settings on one or more of the cameras controlled by the smart device 110. For example, the smart device 110 may change all connected cameras to a "record 1080p video" mode, may cause a subset of the cameras to zoom in, may cause a subset of the cameras to use flash, may switch half the cameras to night mode, and may cause one camera to stream captured video to a cloud storage server. In another example, the smart device 110 may cause each camera to stream live captured video to the smart device 110 for real-time editing and display on the smart device 110 (or on a display coupled to the smart device) by a user of the smart device 110. Various additional examples of camera modes and settings are described above. It should be noted that the smart device 110 may change camera modes and settings any number of times, for instance, as requested by a user of the smart device 110.

In one embodiment, each camera 100, 105 controlled by the smart device 110 includes a camera identifier, for example, a unique identification number (e.g. a MAC address and the like). In this embodiment, the smart device 110 may receive and store the camera identifier when connecting to each camera. The smart device 110 may be configured to connect to and control only certain cameras. For example, the smart device 110 may include a pre-determined list of cameras with which it is compatible (e.g, cameras made by the same manufacturer as the smart device 110, cameras compatible with an application running on the smart device 110, etc.). In this example, if the smart device 110 connects to a camera with which it is not compatible, the smart device 110 may display an incompatibility warning to a user of the smart device 110, and the smart device 110 may not be able to control the camera.

Prior to being controlled by the smart device 110, each camera connected to the smart device 110 via the access point 120 may have an initial configuration, camera mode, and settings (referred to herein as an "initial mode"). For instance, each camera may an initial mode reflecting the previous use of the camera, whether in conjunction with the smart device 110 or use independent of the smart device 110. In one embodiment, each camera has an independent initial mode. The smart device 110 may be configured to determine the initial mode of each camera and store the set of initial modes. In one embodiment, each camera automatically provides the camera's initial mode to the smart device 110 when connecting to the smart device 110. Alternatively, the smart device 110 may query each camera for the camera's initial mode, or may detect each camera's initial mode based on communications between the smart device 110 and each camera.

After the smart device 110 connects to one or more cameras and stores the initial modes of each camera, the smart device 110 may (as described above) change the camera mode of one or more of the connected cameras one or more times. After the smart device 110 (or the user of the smart device 110) is done controlling the one or more cameras, the smart device may retrieve the stored initial modes for the cameras, and may change the configuration and camera mode of the one or more cameras to the stored initial mode. This results in the cameras being configured to operate with the same configuration and camera mode after being controlled by the smart device 110 as before being controlled by the smart device 110.

Alternatively, after the smart device 110 is done controlling the one or more cameras, the smart device 110 may retrieve and transmit the stored initial mode for each of the cameras to the cameras, and each camera may be configured to configure itself to operate in the initial mode received from the smart device 110 associated with the camera. Instead of storing the initial mode of each camera at the smart device 110, each camera may store its initial mode prior to connecting to the smart device 110 at the camera, and may be configured to configure itself to operate in the stored initial mode upon disconnecting from the smart device 110.

As discussed above, the smart device 110 may be configured to provide an interface for controlling the one or more cameras to which the smart device 110 is connected. In the embodiment of FIG. 3, the interface is provided via application 300. The application 300 may be a software application configured to run on a smart device 110. For example, the smart device 110 may be a mobile phone, a laptop, a tablet computer, and the like. Accordingly, the application 300 may be a software application configured to run on such a platform. Although in other embodiments, the smart device 110 may provide other types of interfaces, the description herein will be limited to the context of an application for the purposes of simplicity. This principles described herein apply equally to all types of interfaces.

The application 300 includes a user input module 305, a camera mode module 310, a camera ID storage module 315, and an initial mode storage module 320. The user input module 305 is configured to provide any of a variety of user input mechanisms to allow the user of the smart device 110 to interact with and/or control one or more cameras connected to the smart device 110. For example, the user input module 305 may include buttons (e.g., hardware or software buttons), and/or a touch-sensitive display, allowing a user to identify one or more cameras and perform one or more operations or interactions with the identified cameras. Various user input module 305 embodiments will be discussed below in greater detail.

The camera mode module 310 allows a user of the smart device 110 to adjust, change, or alter the camera mode of one or more cameras connected to the smart device 110. For example, a user may instruct a set of cameras to begin recording video of a first object, may instruct a second set of cameras to focus on a set object with varying zoom levels and take pictures of the second object, may instruct all cameras to transmit live captured video and images to the smart device 110, and may instruct all cameras to enter standby mode when finished. A user, via the camera mode module 310 of the application 300, may configure the cameras to change to any camera mode, setting, or configuration described herein. In one embodiment, the camera mode module 310 stores the initial mode of each camera to which the smart device 110 is connected in the initial mode storage module 320. In this embodiment, the camera mode module 310 may change the camera mode of each camera to which the smart device 110 is connected to the initial mode of the camera (as discussed above) stored in the initial mode storage module 320.

The camera data module 315 allows data to be streamed between the smart device 110 and the cameras connected to the smart device 110. In one embodiment, a user may request, via the camera data module 315, to view images and video stored on a camera (e.g., the camera 100) connected to the smart device 110. In this embodiment, the camera data module 315 may request image and/or video data stored on the camera 100, and in response, the camera 100 provides the image and/or video data to the smart device 110 via the access point 120. The camera data module 315 may then display the retrieved images and/or video on the smart device 110 to the user, for instance in a image/video user interface. Any method of displaying or navigating images and videos on a smart device 110 may be used (e.g., tiled content thumbnails, full-screen display, etc.), and thus the display of images and videos on the smart device 110 will not be discussed further for the purposes of brevity.

In addition to stored images and video, the camera data module 315 may be configured to allow a user the ability to stream live video and to view images as they are taken. For example, a user may request, via the camera data module 315, to stream video being taken by 6 different cameras on the smart device 110 (e.g., as part of a home security system). In this example, each camera sends a live video stream to the smart device 110 via the access point 120, and the camera data module 315 displays the 6 video streams on the smart device 110.

The camera data module 315 may be configured to transfer data to the cameras to which the smart device 110 is connected. In one embodiment, the camera data module 315 is configured to transmit software, firmware, or hardware updates to cameras connected to the smart device 110. Likewise, the camera data module 315 may provide an interface for a user of the smart device 110 to manually manage the credentials stored by the one or more cameras (e.g., cameras 100, 105). In addition, the camera data module 315 may be configured to transmit any additional data, either related to or unrelated to the operation of the cameras, to the cameras.

The camera data module 315 may allow a user to use the smart device 110 as an electronic viewfinder for one or more cameras (e.g., cameras 100, 105). The camera data module 315 may request from one or more cameras the current "view" of the camera, representing the light entering each of the one or more camera's lenses, and in response, each of the one or more cameras transmit the current view of the camera to the smart device 110. The views are then displayed by the camera data module 315 on the smart device 110. In this embodiment, a user may then use the camera mode module 310 to adjust the current view of the camera, to adjust the camera mode or settings to alter the current view of the camera (e.g., by zooming in/out or moving the camera to point in a different direction), or to capture the current view as an image or video. Further, in this embodiment, each of the one or more cameras may continually transmit a current view of the camera such that the camera data module 315 may display a real-time view for the camera.

The camera data module 315 may provide a user with an interface for editing images and/or video received from one or more cameras (e.g., cameras 100, 105) on the smart device 110. For instance, a user may use the user input 305 of the smart device 110 to re-size images and videos, to crop images and videos, to adjust start and stop times of video, to adjust the size or resolution of images and videos, to re-encode images and videos, and the like. The camera data module 315 may store any data received from any camera to which the smart device 110 is connected in the camera data storage module 325. For instance, images and video (either live or previously captured) sent from a camera to the smart device 110 may be stored in the camera data storage module 325. Likewise, video or images from a camera connect to the smart device 110 but edited at the smart device 110 may be stored at the camera data storage module 325.

In one embodiment, the application 300 stores information identifying one or more cameras (e.g., cameras 100, 105) in the camera ID storage module 330. For example, if each camera connected to the smart device 110 via the access point 120 includes an identification number that must be provided to the camera prior to interacting with the camera, the application 300 may receive the identification number from the camera when connecting to the camera and may store the camera identification number in the camera ID storage module 330. In this example, when a user of the application 300 wants to interact with a particular camera, the application 300 may retrieve the identification number for the particular camera from the camera ID storage module 330, and may provide the identification number to the particular camera prior to interacting with the camera. Any type of information identifying a camera may be stored in the camera ID storage module 330, such as an identification number, an IP or MAC address, a camera password, camera credentials, and the like. The identifying information stored in the camera ID storage module 330 may be used to communicate with a camera, to identify a camera to which the smart device 110 has previously connect, to authenticate the smart device 110 or a user of the smart device 110 to a camera, and so forth.

It should be noted that any of the functionality described above with regards to the application 300 may be performed by the smart device 110 without the use of an application. Likewise, it should be noted that any of the functionality performed by the smart device 110 may be performed by a remote control 340. In one embodiment, the smart device 110 is a remote control 340. Alternatively, the embodiment of FIG. 3 may be implemented via a smart device 110 and a remote control 340, which may both be coupled to one or more cameras, either directly or via the access point 120. For example, the smart device 110 may receive streaming video from one or more cameras, and the remote control 340 may be used to start and stop the streaming video. Further, the remote control 340 may receive credentials for the one or more cameras or the access point 120 via the smart device 110, the smart device 110 may receive credentials for the one or more cameras via the remote control 340, and the cameras may receive credentials for the access point 120 or the smart device 110 from the remote control 340. In one embodiment, the remote control 340 is able to operate in access point mode, and is able to connect to multiple cameras. In this embodiment, unlike the smart device 110, the remote control 340 may provide the credentials of the access point 120 to multiple cameras simultaneously.

Camera System Architecture

Figure 4:
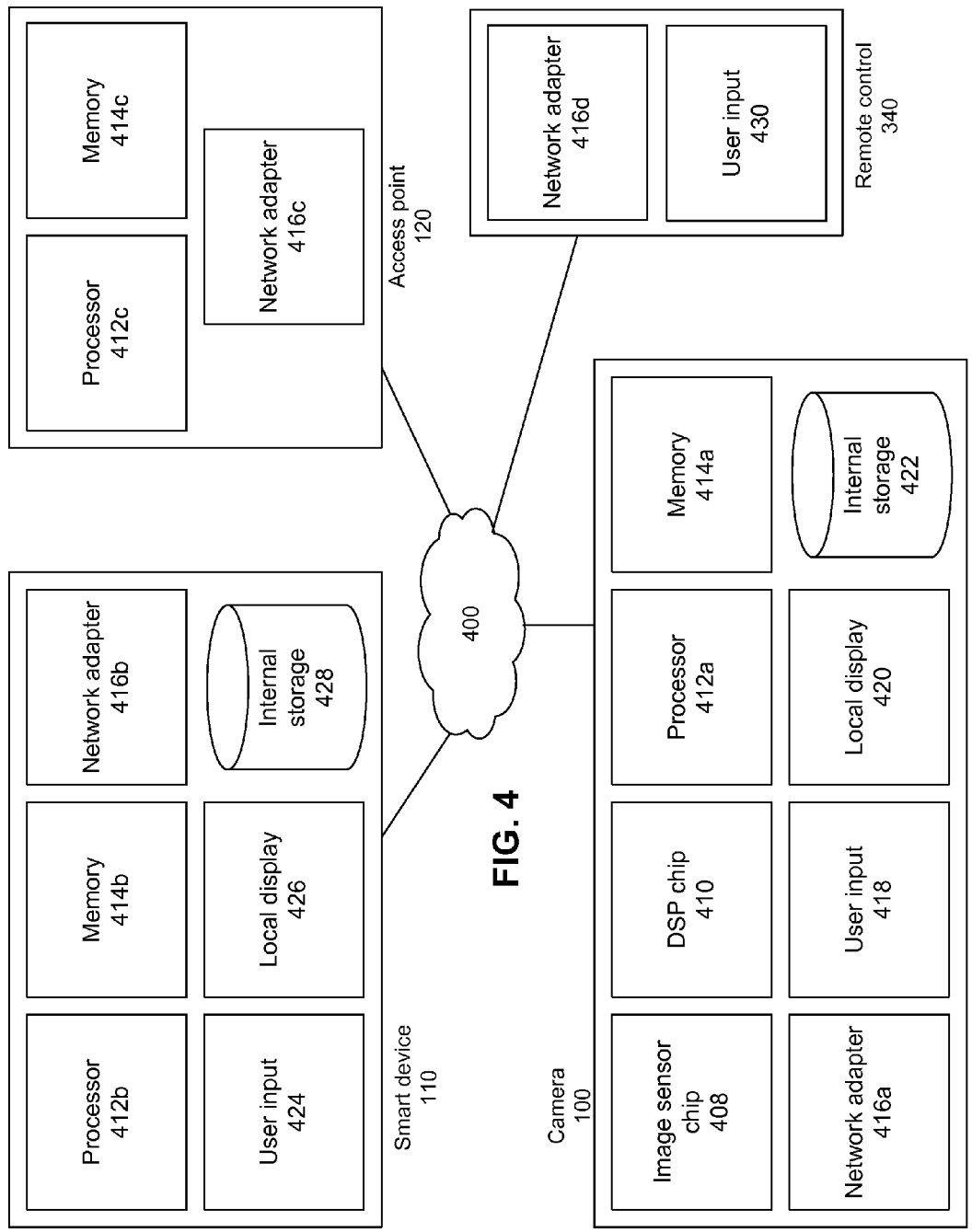
FIG. 4 is a block diagram illustrating an example embodiment of a camera system environment.

FIG. 4 is a block diagram illustrating an embodiment of a camera system environment. In the environment of FIG. 4, a camera 100, a smart device 110, an access point 120, and a remote control 340 communicate through a connecting network 400. Other embodiments of such an environment may contain fewer or additional modules, which may perform different functionalities than described herein. Although only one of each component is illustrated in the environment of FIG. 4, other embodiments can have any number of each type of component, such as hundreds or thousands.

The camera 100 and other components of FIG. 4 may be implemented in computers adapted to execute computer program modules. As used herein, the term "module" refers to computer-readable program instructions and/or data for providing the specified functionality. A module can be implemented in hardware, firmware, and/or software. In one embodiment, the modules are stored on one or more storage devices, loaded into memory, and executed by the processors. Storage devices, memory, and processors are described in greater detail in the description of the camera 100 below; this description applies equally to any of the components of FIG. 4.

The camera 100 of the embodiment of FIG. 4 includes an image sensor chip 408, a DSP chip 410, a processor 412a, a memory 414a, a network adapter 416a, a user input 418, a local display 420, and internal storage 422. The smart device 110 of the embodiment of FIG. 4 includes a processor 412b, a memory 414b, a network adapter 416b, a user input 424, a local display 426, and an internal storage 428. The access point 120 includes a processor 412c, a memory 414c, and a network adapter 416c. The remote control 340 includes a network adapter 416d, and a user input 430. In various alternative embodiments, the components of the embodiment of FIG. 4 may include fewer or additional components not illustrated (e.g., each component may have multiple processors).

In other embodiment, the camera 100, the smart device 110, the access point 120, and the remote control 340 may include fewer or additional components not shown for the purposes of simplicity. For instance, each of the entities of the embodiment of FIG. 4 may include an internal bus, allowing the components of each entity to inter-communicate. In addition, not shown are common components of the camera 100, the smart device 110, the access point 120, and the remote control 340, such as a lens, an aperture, a battery or other power supply, communication ports, speakers, a microphone, an antenna, and the like.

The processors 412a, 412b, and 412c (hereinafter "processors 412") may be any general-purpose processors. Each processor 412 is configured to execute instructions, for example, instructions corresponding to the processes described herein. The memories 414a, 414b, and 414c (hereinafter "memories 414") may be, for example, firmware, read-only memory (ROM), non-volatile random access memory (NVRAM), and/or RAM. The internal storage modules 422 and 428 are, in one embodiment, integrated hard disk drives or solid state memory devices, though in other embodiments may be removable memory devices, such as writeable compact discs or DVDs, removable hard disk drives, or removable solid state memory devices. The memories 414 and/or the internal storage modules 422 and 428 are configured to store instructions and data that can be executed by the processors 412 to perform the functions related to the processes described herein. The memories 414 and the internal storage modules 422 and 428 may be configured to store image or video data captured by the camera 100. It should be noted that in one embodiment, the internal storage modules 422 and 428 are implemented in the same module within the camera 100 as the memories 414a and 414b, respectively.

The network adapters 416a, 416b, 416c, and 416d (hereinafter "network adapters 416") communicatively couple the components of the embodiment of FIG. 4 via the connecting network 400. Each network adapter 416 may include a network card, a modem, or any device configured to allow the camera 100, the smart device 110, the access point 120, and the remote control 340 to inter-communicate via the connecting network 400 and vice versa.

The image sensor chip 408 converts light into an electronic signal. For example, to take an image of the scene in front of the camera 100, the image sensor chip 408 of the camera 100 captures the light reflected off objects in the scene, and converts the photons of the captured light into an electronic signal, such as voltages. The image sensor chip 408 may include any of a variety of image sensors for use in a camera, such as a charge-coupled device image sensor ("CCD"), or a complementary metal-oxide-semiconductor image sensor ("CMOS"). The image sensor chip 408 may convert light into pixel color information using, for example, a bayer sensor or the like.

The DSP chip 410 may convert the captured image information into any of a variety of image formats, such as the JPEG, BMP, GIF, or PNG formats, or any other suitable image format. Likewise, the DSP chip 410 may convert the captured image information into any of a variety of video formats, such as the MOV, AVI, WMV, or MKV formats, or any other suitable image format. The DSP chip 410 may apply any of a variety of encoding techniques, either lossless or lossy, such as the MPEG-2, MPEG-4, h.264, or VC-2 formats. The DSP chip 410 may perform any of a variety of filtering functions, in both the time/space domain and frequency domain. The DSP chip 410 may also perform any of a variety of formatting functions, such a cropping, up- or down-conversion of resolution, color/contrast/brightness adjustment, compression, or any other suitable image or video processing function.

The user input 418 may include one or more buttons on the exterior of the camera 100, and allows a user of the camera 100 to interact with the camera 100. Alternatively, the user input 418 may include a touch-screen component of the local display 420, an external input device, such as a keyboard, mouse or other controller configured to communicate with the camera 100 via an input port or the network adapter 416a, or any other means of interacting with the camera 100. A user may use the user input 418 to perform functions of the camera 100, such as navigating through previously captured images or video, editing or deleting previously captured images or video, altering the camera's settings (such as the resolution or frame rate of future captured images or video, adjusting a power-save mode, or adjusting other camera parameters or settings, such as a night/day mode, a self-timer, an exposure length, and the like), altering the communication mode of the camera (such as switching between access point, ad hoc, and station mode, or cycling through all communication modes), detecting and connecting to other wireless devices via the network adapter 416a, obtaining the wireless credentials of another device, turning the camera 100 on and off, communicating with external modules via the network adapter 416a, and so forth. The user input 418 may include a very limited number of buttons or other interface mechanisms, for instance as few as one or two.

The local display 420 may be implemented with an integrated LCD screen or other similar screen, such as a monochromatic display or other display. Alternatively, the local display 420 may be implemented with a removable display module, such as a LCD pack configured to couple to the camera 100 and communicate with the components of the camera 100 through an internal bus.

The local display 420 may be configured to operate as a user interface for a user of the camera 100. In one embodiment, the local display 420 displays menus, HUDs, UIs, and the like to allow a user to utilize the functionalities of the camera 100 or to inform the user of information related to the camera 100, such as the amount of available storage remaining, the amount of power remaining, the current resolution and/or frame rate of the camera 100, the communication mode of the camera, and any other settings or information related to the camera 100. In one embodiment, the camera 100 is configured to perform the functions of an electronic view finder, allowing a user of the camera 100 to view the images and/or video that the camera 100 will capture, is capturing, or has previously captured.

The local display 420 may be configured to display information related to other devices. For example, the local display 420 may display other wireless devices capable of communicating with or connecting to the camera 100 via the connecting network 400. In addition, the local display 420 may display the identity of one or more devices to which the camera 100 is connected. The local display 420 may also display credential information related to the camera 100. For example, if the local display 420 is displaying a list of devices that the camera 100 has detected, the local display 420 may also display an indication of the devices for which the camera 100 possesses the credentials. A user may utilize the local display 420 in conjunction with the user input 418 to select an communication mode for the camera 100, to select one or more devices to connect to, to select one or more devices to obtain credentials for, to select one or more devices to transmit credentials to, and the like.

The user input 424 of the smart device 110 is configured to allow a user of the smart device 110 to interact with the smart device 110. The user input 424 may be implemented with any of a variety of smart device 110 user input interfaces, such as a keyboard, a keypad, a mouse, a touch-screen interface, a voice-controlled interface, and the like. In general, the user input 424 of the smart device 110 allows for greater user-interface capability than the user input 418 of the camera 100, though this is not necessarily the case. Likewise, the user input 430 of the remote control 340 may contain a similar interface as the user input 418 of the camera 100 (for instance by having the same number of buttons), or may contain a different interface of lesser or greater complexity and flexibility. It should be noted that in instances when the smart device 110 is coupled to the camera 100, the user input 424 may allow a user of the smart device 110 to control and interact with the camera 100 via the smart device 110. Likewise, when the remote control 340 is coupled to the camera 100, the user input 430 may allow a user of the smart device 100 to control and interface with the camera 100 via the remote control 340.

The connecting network 400 enables communications among the entities to which the connecting network 400 is coupled. In one embodiment, the connecting network 400 is the internet and uses standard communications technologies and/or protocols. Thus, the connecting network 400 can include links using technologies such as Ethernet, 802.11, Wifi, worldwide interoperability for microwave access (WiMAX), long term evolution (LTE), GSM, CDMA, EDGE, 3G, and any other wired or wireless communicative protocol and standard. Similarly, the networking protocols used on the connecting network 400 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), and the like. The data exchanged over the connecting network 400 can be represented using technologies and/or formats including the hypertext markup language (HTML), the extensible markup language (XML), and the like. At least a portion of the connecting network 400 can comprise a mobile (e.g., cellular or wireless) data network such as those provided by wireless carriers. In some embodiments, the connecting network 400 comprises a combination of communication technologies.

Operational Configurations

Figure 5:
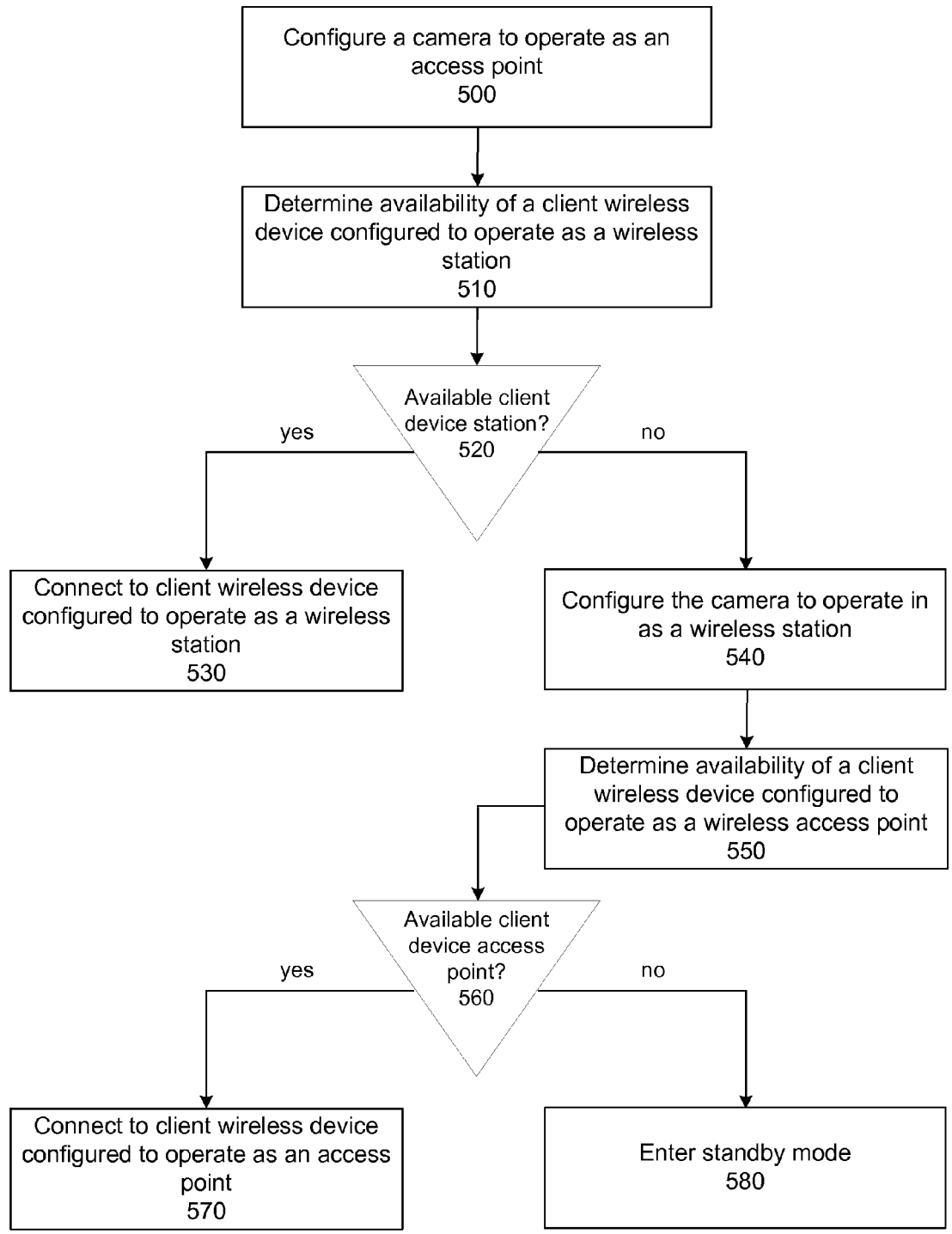
FIG. 5 illustrates an embodiment of a process for detecting devices in a camera system.

FIG. 5 illustrates an embodiment of a process for detecting devices in a camera system. The camera is configured 500 to operate as an access point. The camera may initially be configured to operate in station mode, in a standby mode, or in a startup mode, or the camera may initially be powered off. Configuring the camera to operate as an access point may include configuring the camera to cycle from station mode through various modes including access point mode. Likewise, configuring the camera to operate as an access point may includes configuring the camera to switch from standby mode, startup mode, or from being powered off into access point mode. Note that in one embodiment, configuring the camera to operate as an access point may include configuring the camera to operate in ad hoc mode.

The availability of one or more client wireless devices configured to operate as wireless stations is determined 510. In one embodiment detecting client wireless devices configured to operate as wireless stations involves using the association mode of a wireless protocol, such as Wifi. In an alternative embodiment, detecting client wireless devices may include sending out query signals from the camera within a communicative range of the camera to detect client wireless devices operating as wireless stations or in station mode able to communicate with the camera and within the communicative range of the camera. The query signals may be configured to cause any devices operating as wireless stations or in station mode to transmit an identifying signal from the wireless device to the camera, the identifying signal including information identifying the wireless device to the camera. Any suitable method of detecting client wireless devices operating in as wireless stations may be used, including those utilized by the wireless standards discussed herein, or any proprietary method. It should be noted that the client wireless devices configured to operate as wireless stations may be devices incapable of operating as wireless access points, and thus are only detectable when the camera is configured to operate as a wireless access point.

Responsive to detecting 520 an available client wireless device configured to operate as a wireless station, the camera connects 530 to the client wireless device. Connecting to a client wireless device may involve the passing of wireless credentials between the camera and the client wireless device. In the event that the camera does not possess the required credentials for the client wireless device, the attempt by the camera to connect to the client wireless device may be rejected by the client wireless device. In such a circumstance, the camera may obtain the credentials from an alternative source and may re-attempt to connect to the wireless device. In one embodiment, the camera may not be required to possess the wireless credentials for the client wireless device; in such an embodiment, the camera may immediately connect to the client wireless device.

Responsive to failing to detect 520 an available client wireless device configured to operate as a wireless station, the camera is configured 540 to operate as a wireless station. In one embodiment, an available client wireless device configured to operate as a wireless station is a client wireless device to which the camera has not previously connected. In this embodiment, if the camera previously connects to the client wireless device and subsequently disconnects from the client wireless device, the client wireless device is no longer "available" from the perspective of the camera in detecting client wireless devices configured to operate as a wireless station with which to connect.

The availability of one or more client wireless devices configured to operate as a wireless access point is determined 550. Similarly to determining the availability of one or more client wireless devices configured to operate as a wireless station, determining the availability of one or more client wireless devices configured to operate as wireless access points may involve using the association mode of a wireless protocol, using device-identifying ping signals configured to cause client wireless devices operating as wireless access points to identify themselves with response signals, or any other suitable method of detecting client wireless devices operating as wireless access points.

Responsive to detecting 560 an available client wireless device configured to operate as a wireless access point, the camera connects 570 to the client wireless device. As discussed above, connecting to the client wireless device configured to operate as a wireless access point may require the camera to possess the wireless credentials of the client wireless device and may require the camera to obtain the wireless credentials of the client wireless device if the camera does not possess the wireless credentials. Responsive to failing to detect 560 an available client wireless device configured to operate as a wireless access point, the camera enters 580 standby mode. In one embodiment, entering standby mode includes configuring the camera to continue to operate as a wireless station. Alternatively, entering standby mode may include configured the camera to operate in a power-saving mode, a communication-free mode, a communication-slow-down mode, or may cause the camera to power off.

The process of the embodiment of FIG. 5 may be repeated any number of times as needed, causing the camera to cycle between operating as a wireless access point and a wireless station, detecting various client wireless devices configured to operate both as wireless stations or access points. In various embodiments, the process of FIG. 5 may be augmented to allow a user of a camera to select one or more of many client wireless devices with which to connect, and may include various means for obtaining the wireless credentials of one or more client wireless devices, for instance as discussed in the embodiments of FIGS. 6-8.

Figure 6:
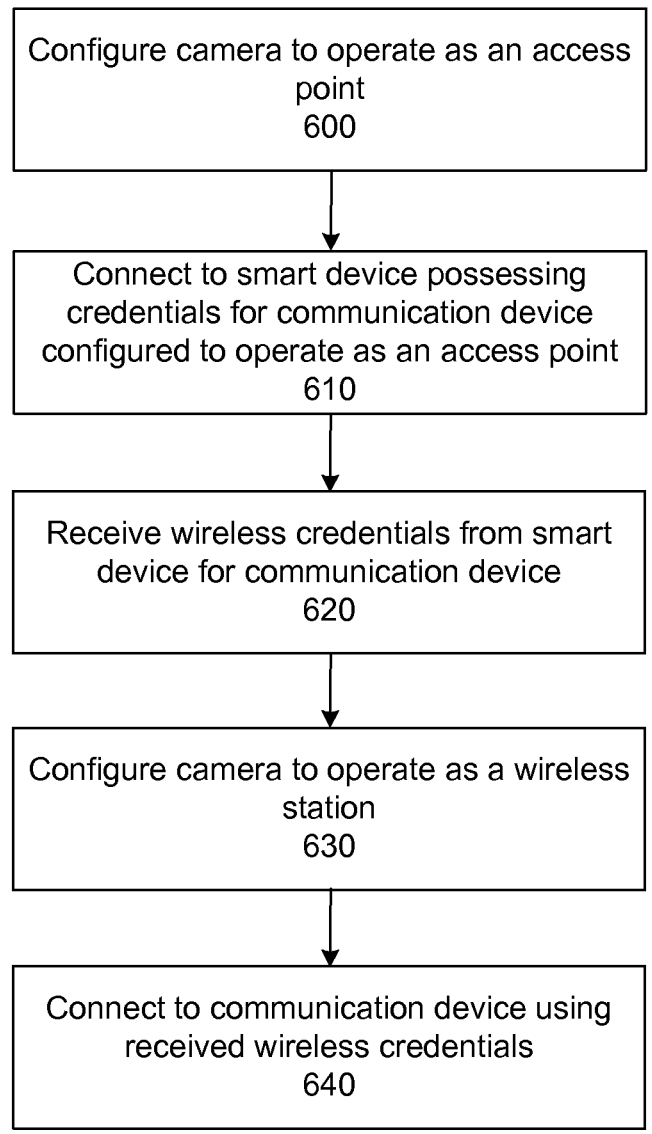
FIG. 6 illustrates a first example embodiment of a process for transferring credentials in a camera system.
Figure 7:
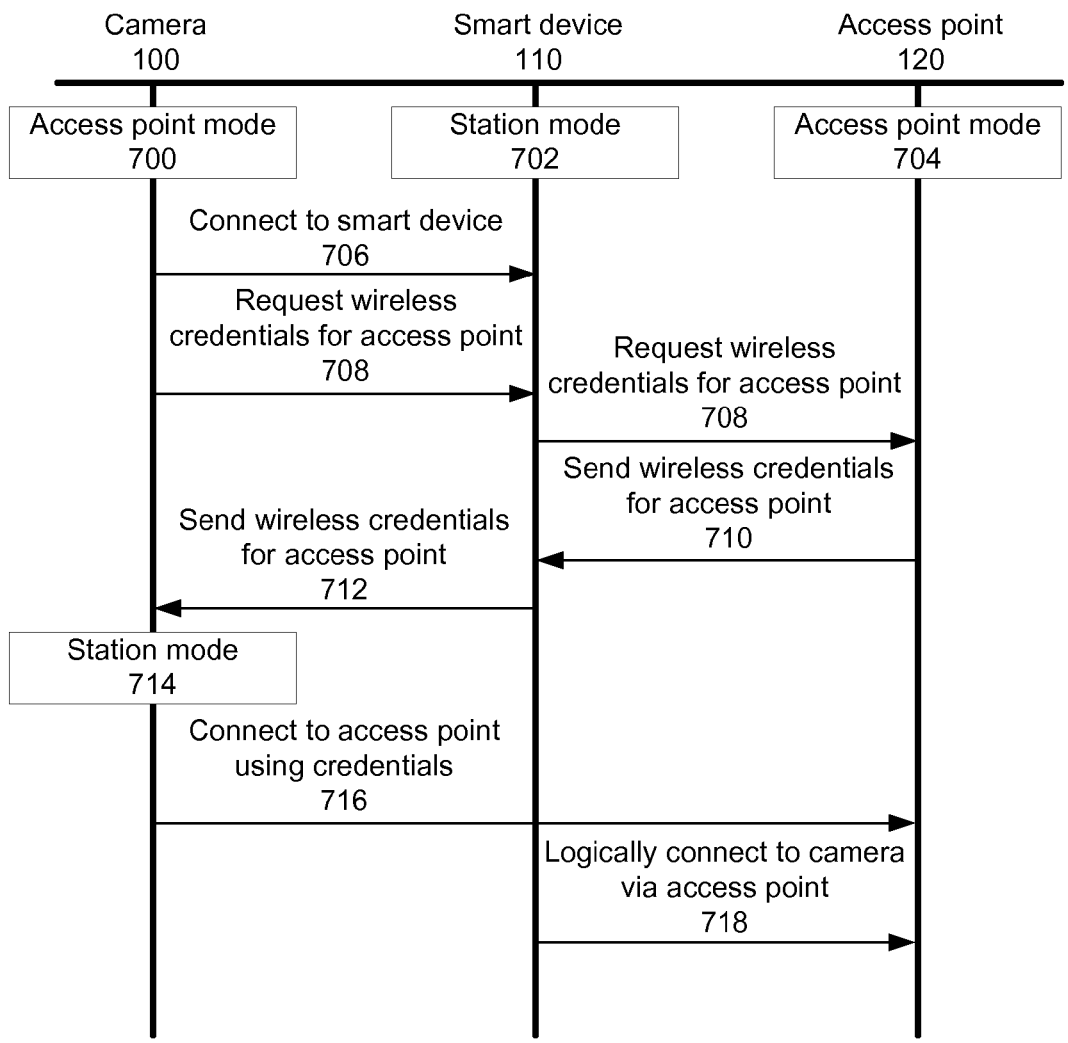
FIG. 7 is a timing diagram illustrating the operation of an embodiment of a process for transferring credentials in a camera system.

FIG. 6 illustrates an embodiment of a process for transferring credentials in a camera system. FIG. 7 is a timing diagram illustrating the operation of an embodiment of a process for transferring credentials in a camera system, and will be discussed in the context of FIG. 6. FIGS. 6 and 7 are described herein in the context of the camera system of FIGS. 1-4. In the embodiments of FIGS. 6 and 7, the camera 100 initially does not possess the wireless credentials required to connect to a communication device configured to operate as an access point, and the smart device 110 initially may possess the wireless credentials required to connect to the communication device configured to operate as an access point. The remainder of the description herein will refer to the communication device configured to operate as an access point as the access point 120, though in other embodiments, the communication device may be any device configured to operate as a wireless access point and to connect to devices that possess the communication device's wireless credentials.

Although not illustrated in the embodiment of FIGS. 6 and 7, the camera 100 may initially be configured to operate in station mode, and may detect and attempt to connect to the access point 120. In response to the attempt to connect, the access point 120 may query the camera 100 for the wireless credentials required to access the access point 120. In response to such a query, the camera 100 indicates to the access point 120 a lack of the required credentials, and the access point 120 denies the connection attempt.

The camera 100 is configured 600 to operate in access point mode. This is illustrated in FIG. 7 as access point mode 700. In one embodiment, the camera 100 is configured to operate in access point mode responsive to a denied connection attempt by the access point 120. In response to the denied connection attempt, the camera 100 may detect the smart device 110 as an available wireless device possessing the wireless credentials required to connect to the access point 120. The camera 100 is then configured to connect 610 to the smart device 110. As illustrated in FIG. 7, the camera 100 connects 706 to the smart device 110.

Wireless credentials are received 620 from the smart device 110 for the access point 120. In the embodiment of FIG. 7, receiving wireless credentials from the smart device 110 for the access point 120 involves the camera 100 sending 708 a request to the smart device 110 for the wireless credentials of the access point 120. In one embodiment, the smart device 110 already possesses the wireless credentials for the access point 120, and sends 712 the wireless credentials to the camera 100. Alternatively, the smart device 110 may retrieve the wireless credentials from the access point 120 by requesting 708 the wireless credentials from the access point 120. Such a request may require the smart device 110 to identify itself to the access point 120, to identify the camera 100 to the access point 120, or to provide additional information involving the camera 100, the user of the camera 100, the smart device 110, the user of the smart device 110, or any other information related to the operation of the camera 100 or the smart device 110. Responsive to receiving the request for wireless credentials from the smart device 110, the access point 120 may approve the request and may send 710 the wireless credentials for the access point 120 to the smart device 110, for subsequent sending 712 to the camera 100.

In response to receiving the wireless credentials for the access point 120 from the smart device 110, the camera 100 is configured 630 to operate as a wireless station. In one embodiment, by switching from operating as a wireless access point to operating as a wireless station, the camera 100 may disconnect from the smart device 110, particularly if the smart device 110 is incapable of operation as an access point, thereby requiring another device to operate as an access point in order to connect to the other device. In other embodiments, the camera 100 is not configured to operate as a wireless station, and instead continues operation as a wireless access point. It is noted that configuring the camera 100 to operate as a wireless station may improve the power efficiency and performance of the camera 100. Configuring the camera 100 to operate as a wireless station is represented as station mode 714 in FIG. 7.

The camera 100 connects 640 to the access point 120 using the wireless credentials received for the access point 120 from the communication device. As illustrated in FIG. 7, the camera 100 connects 716 to the access point 120 directly, bypassing the smart device 110, using the wireless credentials for the access point 120. Once the camera 100 is connected to the access point 120, the smart device 110 may also connect to the access point 120. The smart device 110 may then logically connect to the camera 100 via the access point 120, without directly connecting to the camera 100. Thus, communications may be sent from the smart device 110 to the access point 120, which are then forwarded to the camera 100. Likewise, communications may be sent from the camera 100 to the access point 120, which are then forward to the smart device 110. In such a way, the smart device 110 may control and interact with the camera 100 via the access point 120 without a direct connection to the camera 100, and may receive video and images from the camera 100 via the access point 120.

Figure 8:
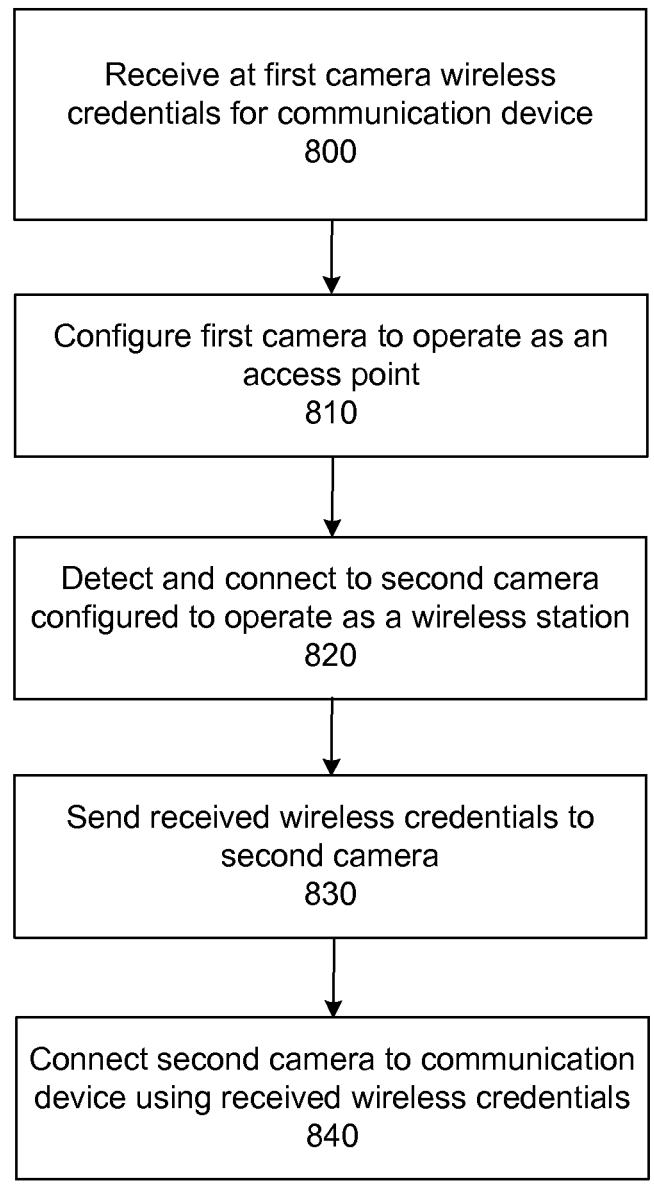
FIG. 8 illustrates a second example embodiment of a process for transferring credentials in a camera system.

FIG. 8 illustrates an embodiment of a process for transferring credentials within a camera system. Wireless credentials are received 800 at a first camera for a communication device. The wireless credentials may be received wirelessly from a smart device, which may obtain the wireless credentials in advance or which may retrieve the wireless credentials from the communication device or elsewhere responsive to a request from the first camera. Alternatively, the wireless credentials may be received via a wired connection with a smart device, for example via a USB port or an audio port configured to receive the wireless credentials encoded into audio signals. In one embodiment, the wireless credentials may be encoded into an image and displayed to the first camera, and the first camera may be configured to capture the displayed image and decode the captured image to retrieve the wireless credentials. Any suitable means of receiving the wireless credentials at the first camera may be used. The communication device may be configured to operate as a wireless access point, and the wireless credentials may be configured to allow a wireless device possessing the wireless credentials to connect to and communicate with the communication device.

The first camera is then configured 810 to operate as an access point. In one embodiment, this involves configuring the first camera to operate in access point mode. A second camera configured to operate as a wireless station is detected, and the first camera is configured to connect 820 to the second camera. In an alternative embodiment, instead of configuring the first camera to operate as an access point and configuring the second camera to operate as a wireless station, the first camera and the second camera may instead be configured merely to detect each other, connect to each other, and for the first camera to transmit wireless credentials to the second camera.

The wireless credentials received by the first camera are sent 830 to the second camera. The second camera 840 then connects 840 to the communication device using the received wireless credentials. In one embodiment, the first camera subsequently is configured to operate as a wireless station and is configured to connect to the communication device using the received wireless credentials. This process may be repeated for any number of additional cameras, wherein the first camera sends the wireless credentials for the communication device to additional cameras, and wherein the additional cameras each connect to the communication device using the wireless credentials.

In one embodiment, the first camera is configured to send the wireless credentials for the communication device to multiple additional cameras simultaneously. Such an embodiment is possible if the first camera is configured to operate as a wireless access point, and each of the additional cameras is configured to operate as a wireless station, since one wireless access point is able to connect to multiple wireless stations simultaneously. By simultaneously transmitting credentials to multiple addition cameras, the amounts of time required to transmit the credentials from the first camera to the additional cameras and for the additional cameras to connect to the communication device are minimized, resulting in an increase in performance efficiency. Further, such a process prevents a user from having to individually transfer the credentials to each camera; for embodiments with tens or hundreds of cameras, the amount of effort saved in transferring the wireless credentials to each camera may be significant.

Figure 9:
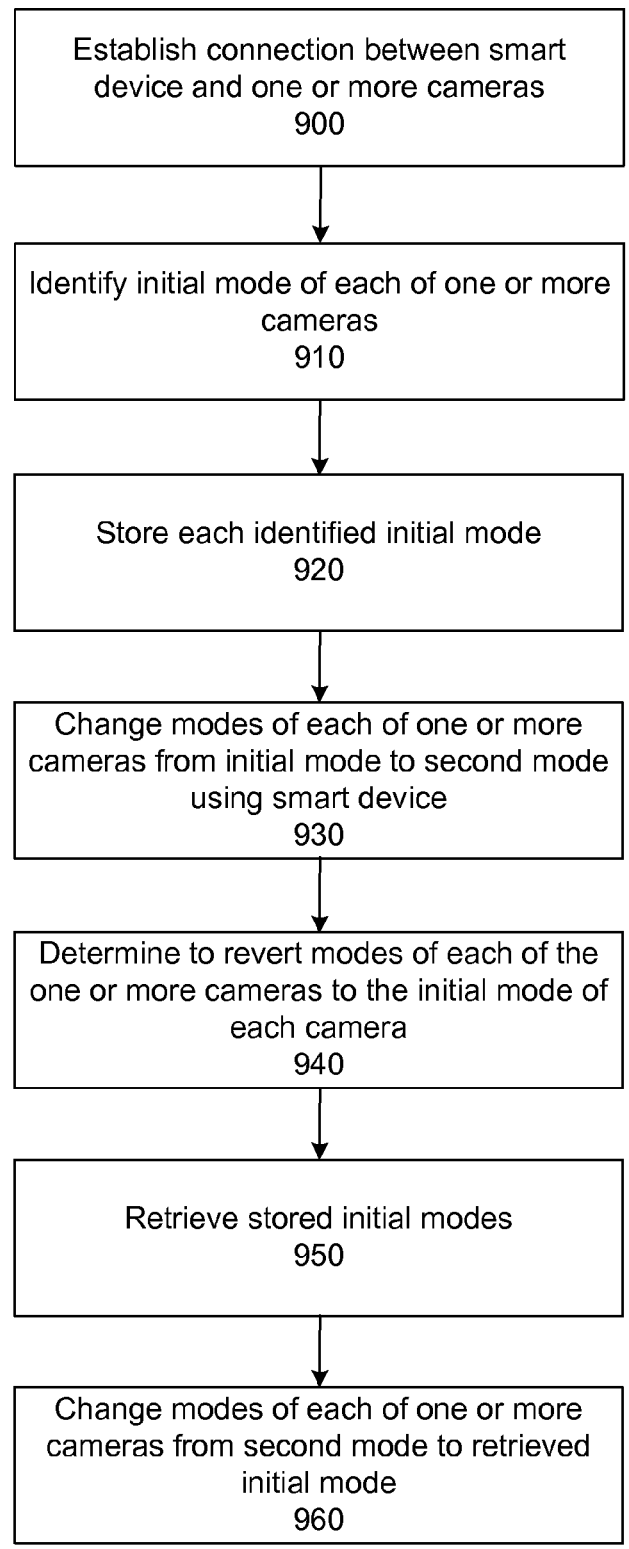
FIG. 9 illustrates an embodiment of a process for managing camera operation modes in a camera system.

FIG. 9 illustrates an embodiment of a process for managing camera operation modes in a camera system. A connection is established 900 between a smart device and one or more cameras. At the time of connection, each of the one or more cameras may be configured to operate in a particular operation mode (referred to herein as the "initial" mode of each camera). The smart device may be a mobile phone, a tablet computer, a remote control, or any device capable of connecting and interfacing with one or more cameras. In one embodiment, the connection is established between the smart device and the one or more cameras through a communication device configured to operate as an access point, such as a Wifi access point, a mobile phone communication tower, or any other communication device configured to allow the smart device to logically connect to the one or more cameras via the communication device.

The initial mode of each of the one or more cameras is identified 910. In one embodiment, each camera identifies its initial mode to the smart device after connecting to the smart device. Alternatively, the smart device may query each camera to determine the initial mode of each camera. The initial modes are all then stored 920 for subsequent retrieval. As referred to herein, storing the initial modes of each camera may comprise merely storing an initial mode identifier, or storing configuration information describing the initial mode. The initial mode of each camera may be stored at the smart device, may be stored at each camera, or may be stored elsewhere by the smart device.

During the course of operation and interaction between the smart device and the one or more connected cameras, the modes of the one or more cameras are changed 930 from the initial mode of each camera to a second mode. In one embodiment, the smart device changes the mode of each of the cameras. For instance, the smart device may present an interface to a user of the smart device allowing the user to change the mode of the cameras. As discussed above, changing the mode of the camera may include change the camera mode of the camera (for example, between image mode, burst image mode, video mode, high-speed video mode, and the like), the positioning and orientation of the camera, the zoom of the camera, the capturing of images and videos, and the like. The mode of each camera may be changed any number of times, though reference will only be made herein to the initial mode and the second mode for the purposes of simplicity.

A determination is made 940 to revert each of the one or more cameras to the initial mode of each camera. In one embodiment, making such a determination includes determining to disconnect the one or more cameras from the smart device. Alternatively, making such a determination may include providing an interface on the smart device for a user to manually revert the modes of each of the one or more cameras to the initial mode of each camera. For example, the smart device may be configured to operate a program which provides a button that, when selected by a user of the smart device, reverts the mode of each camera to the initial mode of each camera.

Responsive to determining to revert each of the one or more cameras to the initial mode of each camera, the stored initial mode for each camera is retrieved 950. In one embodiment, the smart device retrieves the stored initial mode for each camera. Alternatively, each camera may retrieve the initial mode for itself, for example in the embodiment where the initial mode of each camera is stored at each camera. The mode of each of the one or more cameras is changed 960 to the retrieved initial mode of each camera. In one embodiment, changing the mode of a camera to the initial mode of the camera includes the smart device transmitting the initial mode (or an identifier of the initial mode or configuration information describing the initial mode) to the camera, and the camera switching itself to the received initial mode. In the embodiment where a camera stores the initial mode of itself at the camera, the smart device may merely instruct the camera to change to the stored initial mode and the camera, responsive to receiving such an instruction, converts itself to the initial mode it is storing.

It should be noted that in one example embodiment, the mode of only a portion of the one or more cameras is changed from an initial mode to a second mode; in such an embodiment, the mode of only the portion of the one or more cameras is reverted to the initial mode of each camera in the portion of the one or more cameras. Similarly, in one embodiment, a determination is made to revert only a portion of the one or more cameras to the initial mode of each camera, for instance by determining to disconnect only the portion of cameras from the smart device. In such an embodiment, the mode of only the portion of the one or more cameras is reverted to the initial mode of each camera in the portion of the one or more cameras.

The process of FIG. 9 allows a user of the one or more cameras to set the one or more cameras up in a particular configuration, to connect a smart device to the one or more cameras, to control/interact/change the mode of the one or more cameras with the smart device, and then to revert the one or more cameras to the original configuration. Such a process beneficially allows the user to quickly adapt and modify the modes of the one or more cameras temporarily, without a loss of the time and effort put into establishing the original configuration of the one or more cameras. Thus, a user may precisely configure the cameras for long-term operation, may quickly re-configure the cameras for short-term operation, and then may revert the cameras to the original configuration with very little additional effort on the part of the user.

The camera system described herein beneficially allows for the transferring of wireless credentials between a camera and another device, preventing the need to manually enter the wireless credentials directly into the camera via a camera's limited input means and mechanisms. The camera described herein can detect another device by switching between operation as a wireless station and as a wireless access point. Such a configuration beneficially allows the camera to detect devices configured to operate only as wireless stations while simultaneously optimizing the amount of time the camera itself is configured to operate as a power-efficient wireless station. Using similar means and mechanisms, the camera can then wirelessly transmit the received credentials to other cameras simultaneously, increasing the efficiency of the system. Finally, by preserving the initial mode of each of one or more cameras wirelessly coupled to a smart device, the camera system can efficiently revert each camera to the operating mode of the camera prior to coupling to the smart device, saving the user of such cameras from having to manually revert each camera mode.

It is noted that terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera management system as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A smart device for communicating with one or more cameras, the smart device comprising a processor and a non-transitory computer-readable storage medium containing instructions that, when executed by the processor, cause the smart device to:
   establish a connection between the smart device and one or more cameras configured to communicate with the smart device, each of the one or more cameras configured to operate in an initial mode;
   identify the initial mode of each of the one or more cameras;
   store each identified initial mode at the smart device;
   after establishing the connection between the smart device and the one or more cameras, change, for each camera of a portion of the one or more cameras, the mode of the camera from the initial mode of the camera to a second mode; and
   in response to receiving an input at the smart device configured to, for each camera in the portion of the one or more cameras, change the mode of the camera from the second mode to the initial mode:
      retrieve the stored initial mode of each camera in the portion of the one or more cameras from the smart device; and
      for each camera of the portion of the one or more cameras, change the mode of the camera to the retrieved initial mode of the camera.

2. The smart device of claim 1, wherein the one or more cameras are configured to operate as wireless stations, and wherein establishing a connection between the smart device and the one or more cameras comprises configuring the smart device to operate as a wireless access point.

3. The smart device of claim 1, wherein identifying the initial mode of each of the one or more cameras comprises:
   querying each of the one or more cameras for the initial mode of the camera; and
   receiving from each of the one or more cameras initial mode information describing the initial mode of the camera.

4. The smart device of claim 1, wherein the initial mode of each camera comprises the configuration of the camera at the time the connection is established between the camera and the smart device.

5. The smart device of claim 1, wherein changing the mode of each camera to the retrieved initial mode of the camera comprises sending the initial mode from the smart device to the camera and instructing the camera to switch modes to the initial mode.

6. The smart device of claim 1, wherein the portion of the one or more cameras comprises all of the one or more cameras.

7. The smart device of claim 1, wherein the instructions further cause the smart device to:
   for each camera in the portion of the one or more cameras, change the mode of the camera to a third mode.

8. The smart device of claim 1, wherein the instructions further cause the smart device to, after changing the mode of each camera in the portion of one or more cameras:
   disconnect from the one or more cameras.

9. A method comprising:
   establishing a connection between a smart device and one or more cameras configured to communicate with the smart device, each of the one or more cameras configured to operate in an initial mode;
   identifying the initial mode of each of the one or more cameras;
   storing each identified initial mode at the smart device;
   after establishing the connection between the smart device and the one or more cameras, changing, for each camera of a portion of the one or more cameras, the mode of the camera from the initial mode of the camera to a second mode; and
   in response to receiving an input at the smart device configured to, for each camera in the portion of the one or more cameras, change the mode of the camera from the second mode to the initial mode:
      retrieving the stored initial mode of each camera in the portion of the one or more cameras from the smart device; and
      for each camera of the portion of the one or more cameras, changing the mode of the camera to the retrieved initial mode of the camera.

10. The method of claim 9, wherein the one or more cameras are configured to operate as wireless stations, and wherein establishing a connection between the smart device and the one or more cameras comprises configuring the smart device to operate as a wireless access point.

11. The method of claim 9, wherein the initial mode of each camera comprises the configuration of the camera at the time the connection is established between the camera and the smart device.

12. The method of claim 9, wherein changing the mode of each camera to the retrieved initial mode of the camera comprises sending the initial mode from the smart device to the camera and instructing the camera to switch modes to the initial mode.

* * * * *